US006852765B2

(12) United States Patent
Decker et al.

(10) Patent No.: US 6,852,765 B2
(45) Date of Patent: Feb. 8, 2005

(54) LOW GLOSS FREE RADICAL POWDER COATINGS

(75) Inventors: Owen Hugh Decker, Houston, TX (US); Frederick Lloyd Bailey, Houston, TX (US); Rajendra Kumar Polu, Houston, TX (US); Carmen Flosbach, Wuppertal (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 129 days.

(21) Appl. No.: 10/165,652

(22) Filed: Jun. 7, 2002

(65) Prior Publication Data

US 2003/0087029 A1 May 8, 2003

Related U.S. Application Data

(60) Provisional application No. 60/297,100, filed on Jun. 8, 2001.

(51) Int. Cl.[7] .................. C08G 65/332; C09D 5/03; C09D 171/02; C09D 175/10
(52) U.S. Cl. .................. 522/2; 522/6; 524/424; 524/439; 524/442; 524/492; 525/123; 525/165
(58) Field of Search .................. 522/2, 6; 524/424, 524/439, 442, 492; 525/123, 165

(56) References Cited

U.S. PATENT DOCUMENTS

| | | | |
|---|---|---|---|
| 4,419,495 A | 12/1983 | Davis | |
| 5,789,039 A | 8/1998 | Biller et al. | |
| 5,824,373 A | 10/1998 | Biller et al. | |
| 5,877,231 A | 3/1999 | Biller et al. | |
| 5,922,473 A | 7/1999 | Muthiah et al. | |
| 5,935,661 A | 8/1999 | Biller et al. | |
| 6,001,428 A | 12/1999 | Finter et al. | |
| 6,005,017 A | 12/1999 | Daly et al. | |
| 6,011,080 A | 1/2000 | Daly et al. | |
| 6,017,593 A | 1/2000 | Daly et al. | |
| 6,017,640 A | 1/2000 | Muthiah et al. | |
| 6,090,236 A | 7/2000 | Nohr et al. | |
| 6,136,882 A | 10/2000 | Daly et al. | |
| 6,284,321 B1 | 9/2001 | Brindoepke et al. | |

FOREIGN PATENT DOCUMENTS

| EP | 0702040 B1 | 3/1996 |
|---|---|---|
| WO | WO 9705963 | 2/1997 |
| WO | WO 9705964 | 2/1997 |
| WO | WO 9914524 A2 | 3/1999 |
| WO | WO 0008067 | 2/2000 |

OTHER PUBLICATIONS

Copy of the Notification of Transmittal of the International Search Report.

*Primary Examiner*—Nathan M. Nutter

(57) ABSTRACT

The present invention is directed to a powder coating composition that produces a low gloss coating upon cure. The powder coating composition includes one or more crosslinkable base polymer, a crosslinkable acrylic polymer and one or more free radical initiators. By adding spheroidal particles to the powder coating composition further reduction in gloss can be obtained while improving smoothness. These compositions are well suited to produce coatings on metallic substrates, such as automotive bodies and non-metallic substrates, such as reconstituted wood substrates, used for desk or table tops.

7 Claims, No Drawings

LOW GLOSS FREE RADICAL POWDER COATINGS

CROSS-REFERENCE TO RELATED APPLICATION

This application is a non-provisional claiming priority from a provisional application having Ser. No. 60/297,100 filed on Jun. 8, 2001.

FIELD OF THE INVENTION

The present invention is directed powder coating compositions and more particularly directed to a class of powder coating compositions that upon cure result in low-gloss coatings preferably having smooth finish.

BACKGROUND OF THE INVENTION

Powder coatings are widely used to provide a decorative and/or protective coating on substrates. They are becoming increasingly popular because they are applied in a solid state or slurry. Unlike conventional liquid coating compositions, the powder coating compositions use little or no solvents. In addition, solid state application permits the powder to be collected, purified and re-used.

UV curable powders have been used in powder coating compositions. Typically, UV curable powders are formulated from solid crosslinkable base resins with low Tg, such as crosslinkable polyesters; crosslinkable co-polymerizable crosslinker resins, such as vinyl ethers; photoinitiators; flow and leveling agents; and, if necessary, pigments and fillers.

During coating operations, UV curable powders are applied to a substrate in the usual fashion, using electrostatic spray techniques. The coated substrate is then heated for as long as it takes to drive out substrate volatiles and fuse the powders into a smooth molten film. Immediately following fusion, the molten film is exposed to UV light, which, in an instant, cures and hardens the film into a durable, smooth, attractive coating.

In certain applications, it is necessary or desirable for the powder coating to have a surface that is preferably smooth in appearance, but has a low gloss or shine. Such applications are those where low gloss is aesthetically desired, or where glare from the coating surface can interfere with the safe or proper use of the coated article, such as desks, tables, counter tops or other horizontal work surfaces, optical devices, motor vehicles, aircraft and ships.

One drawback of UV curable powders is that it is very hard to produce a low gloss (i.e., matte) coating from such powders since the coatings resulting therefrom tend to be glossy. Gloss reduction can normally be obtained in traditional powder coatings through the introduction of matting agents, such as fillers or waxes, which rise to the surface during curing and cause matting through disruption of the surface of the coating. However, due to the fast cure rate of UV curable powders, conventional fillers or waxes cannot flocculate to the surface fast enough to produce the low gloss and they remain trapped within the coating. Higher amounts of fillers or waxes, which can be employed to overcome this problem, tend to cause the powders to block or cake during normal storage and/or produce coatings with severe orange peel, limiting the amount of gloss reduction that could be attained.

One approach to tackle the foregoing problem associated with obtaining low gloss coating's from UV curable powder coating compositions was presented in U.S. Pat. No. 6,017,593. In U.S. Pat. No. 6,017,593, low gloss was obtained by the use of a mixture of crystalline and amorphous resins and by adding a cooling step after the melting step but before, the photoinitiated curing step during which the crystalline resin recrystallizes. However, the process in U.S. Pat. No. 6,017,593 is limited in practical applications to only those substrates having a uniform heating and cooling profile. Thus, the process of U.S. Pat. No. 6,017,593 gives rise to differential crystallization, differing gloss, and a mottled appearance when used with substrates having variable heating and cooling profiles, such as non-metallic substrates or those having varying thicknesses, sharp edges and corners.

Therefore, it would be desirable to provide a method for producing coatings with a low gloss appearance from UV curable powder coating compositions on substrates having variable heating and cooling profiles, such as non-metallic substrates.

STATEMENT OF THE INVENTION

The present invention is directed to a powder coating composition that produces a low gloss coating upon cure, said composition comprising:

a base polymer selected from the group consisting of a crosslinkable polyester, crosslinkable polyurethane, crosslinkable acrylated polyether and a combination thereof;

about 5 percent to about 60 percent of crosslinkable acrylic polymer; and about 0.1 to 10 percent of one or more free radical initiators, all percentages in weight percent based on total weight of said crosslinkable base and acrylic polymer solids.

The present invention is also directed to a process for producing a coating having low gloss, said process comprising the steps of:

applying over a substrate a layer of low gloss powder coating composition comprising a base polymer selected from the group consisting of a crosslinkable polyester, crosslinkable polyurethane, crosslinkable acrylated polyether and a combination thereof; about 5 percent to about 60 percent of crosslinkable acrylic polymer; and about 0.1 to 10 percent of one or more free radical initiators, all percentages in weight percent based on total weight of said crosslinkable base and acrylic polymer solids;

heating said layer into a film; and curing said film into said coating having low gloss.

The present invention is further directed to a process for producing a low gloss powder coating composition comprising the steps of:

mixing a base polymer selected from the group consisting of a crosslinkable polyester, crosslinkable polyurethane, crosslinkable acrylated polyether and a combination thereof with about 5 percent to about 60 percent of a crosslinkable acrylic polymer and about 0.1 to 10 percent of one or more free radical initiators to form a blend, all percentages in weight percent based on total weight of said crosslinkable base and acrylic polymer solids;

heating said blend into a molten blend;

melt extruding said molten blend into a molten extrudate;

solidifying said molten extrudate into a solid extrudate;

fracturing said solid extrudate into fragments; and grinding said fragments.

DETAILED DESCRIPTION OF THE PREFERRED EMBODIMENT

As defined herein:

"Low gloss coatings" means coatings having a gloss ranging from 0.1 to 80, preferably ranging from 1 to 50, more preferably 10 to 30 when measured at a reflectance angle of 60° by Micro-Tri-Gloss Glossimeter supplied by B Y K Gardner, Pomano Beach, Fla.

"Smooth Coatings" means coatings having a writable and appearance smoothness. A coating is considered to be writably smooth if a line drawn manually using a fine ball point pen on a standard photocopy quality paper placed directly over the coated surface appears visually to be continuous (uninterrupted) and regular (non-wiggly). The appearance smoothness of the coating is determined on a scale of 1 to 10 by using PCI (Powder Coating Institute, Alexandria, Va.) smoothness standards, 1 representing heavy orange peel and 10 representing highest degree of smoothness.

"Crosslinkable polymer" means a polymer having one or more carbon-carbon double bonds positioned in the backbone of the polymer, pendant from the backbone of the polymer, terminally positioned on the backbone of the polymer, or a combination thereof.

The term "spheroidal" as used herein means generally spherical in shape. More specifically, the term means filler materials that contain less than 25% particle agglomerates or fractured particles containing sharp or rough edges. The spheroidal particles should be non-reactive or inert so as not to interfere with the other properties of the composition.

"Reconstituted wood substrate" (RWS) means, substrates produced from wood particles, fibers, flakes or chips, such as, a hardboard, a medium density fiberboard, an oriented strand board also known as wafer board, a flake board, a chipboard and a particleboard. Such a RWS is typically fabricated under heat and pressure from particles, fibers, flakes or chips. RWS is produced by treating particles, flakes, chips or fibers with a binder and then arranging these treated particles, flakes, chips or fibers in the form of a mat under dry or wet conditions. The mat is then compressed into a dense substrate, typically in a sheet form, by the application of heat and pressure. The binder binds particles, flakes, chips or fibers and enhances the structural strength and integrity of the RWS and its water resistance. The RWS, if desired, may be molded into desired shape or provided with a textured surface, such as, wood grain texture. Some examples of the RWS, which include medium density fiberboard, oriented strand board, particle board, flake board and underlayment are further defined below.

"Medium density fiberboard" means a board manufactured from lignocellulosic fibers bonded under heat and pressure by means of a well dispersed synthetic resin or a similar binder. Such a board is manufactured to a specific gravity of 0.50 to 0.88.

"Oriented strand board (OSB)" means a board manufactured from lignocellulosic strand-type flakes purposefully aligned in a direction that makes the resultant board stronger, stiffer and having improved dimensional properties in the direction of alignment when compared to a board having random flake orientation. OSB is also known as wafer board.

"Particle board" means a board manufactured from wood particles bonded under heat and pressure by means of a well dispersed synthetic resin or similar binder. Such a board includes conventional extruded and mat-formed particle boards.

"Flake board" means a board manufactured from wood flakes bonded under heat and pressure by means of a well dispersed synthetic resin or similar binder.

"Underlayment" means a smooth flat RWS used as a floor panel upon which resilient floor covering may be glued.

"Plywood" means a glued wood panel made up of relatively thin layers of veneer with the grain of adjacent layers at right angles or a panel made up of veneer in combination with a core of lumber or of RWS.

The powder coating compositions of this invention provide the formulator with an opportunity to control the gloss of the final coating while minimizing or eliminating the negative effects of the prior art attempts at controlling gloss; i.e., loss of coating flow and creation of "orange peel" surface effects.

The applicants have unexpectedly discovered that the gloss of a coating resulting from a UV curable powder coating composition can be controlled by utilizing a blend of one or more free radically-curable base polymers and one or more free radically-curable acrylic polymers to provide coatings with low gloss, presumably through a differential-cure mechanism. This effect can be further enhanced by the use of spheroidal particles.

The powder coating composition that produces a low gloss coating upon cure includes a base polymer selected from the group consisting of a crosslinkable polyester, crosslinkable polyurethane, crosslinkable acrylated polyether, and a combination thereof; about 5 percent to about 60 percent, preferably about 10 weight percent to about 50 weight percent, more preferably about 20 to about 40 weight percent of crosslinkable acrylic polymer; and about 0.1 to about 10 percent, more preferably about 0.1 percent to about 4 percent of one or more free radical initiators, all percentages in weight percent based on total weight of the crosslinkable base and acrylic polymer solids.

The base polymer can have a concentration of crosslinkable groups ranging from about 0.3 percent to about 10 percent, preferably from about 0.5 percent to about 5 percent, more from about 0.7 percent to about 3 percent based on the weight of the crosslinkable base polymer. The GPC weight average molecular weight, using polystyrene as a standard, of the base polymer can range from 500 to 20,000, preferably from 1500 to 10,000.

Some of the crosslinkable groups that are suitable for the crosslinkable polyester include acrylate, methacrylate, maleate, fumarate and a combination thereof.

If desired, the crosslinkable polyesters can be blended with other suitable crosslinkable polymers.

The crosslinkable polyesters are generally made by condensing carboxylic acid or polycarboxylic acids (or their anhydrides) with hydroxy or polyhydroxy-functional monomers. Suitable acids include 1,2,4-benzenetricarboxylic acid, 1,2-benzenedioic acid, 1,3-benzenedioic acid, 1,4-benzenedioc acid, cyclohexanedicarboxylic acid; C2 to C12 linear aliphatic diacids, such as adipic acid and dodecanedioc acid; adipic anhydride, succinic anhydride, dodecanedioc anhydride, maleic acid, maleic anhydride, fumaric acid, itaconic acid, C1-C20 aromatic and aliphatic monoacids such as acetic acid, benzoic acid; and ethylenically-unsaturated acids such as acrylic acid and methacrylic acid. Suitable hydroxy-functional monomers include polyols, such as 2-hydroxymethyl-2-methyl-1,3-propanediol; 2,2-bis-(2-hydroxymethyl)-1,3-propanediol; C2 to C12 linear diols, for example 1,2-ethanediol, 1,3-propanediol, 1,4-butanediol and 1,6-hexanediol; branched C2-C12 diols, for example 2-methyl-1,3-propane diol, 2,2-dimethyl-1,3-propane diol and 2-ethyl-2-butyl-1,3-propanediol; alicyclic diols, for example 1,2-cyclohexanediol, 1,4-cyclohexanediol and 1,4-cyclohexanedimethanol.

Some of the suitable commercial crosslinkable polyesters include those supplied by:

I. UCB Chemicals of Smyrna, Ga. under the trademark Uvecoat® 1000 Unsaturated polyester resin with methacrylate end groups, Uvecoat® 1100 Unsaturated polyester resin with methacrylate end groups, Uvecoat® 2000 Unsaturated polyester resin with methacrylate end groups, Uvecoat® 2100 unsaturated polyester resin with methacrylate end groups, Uvecoat® 2101 Unsaturated polyester resin, Uvecoat® 2200 Unsaturated polyester resin with methacrylate end groups, Uvecoat® 2300 Unsaturated polyester resin with methacrylate end groups, Uvecoat® 9000 crystalline unsaturated polyester resin with methacrylate end groups, Uvecoat® 9010 crystalline unsaturated polyester resin with methacrylate end groups and Uvecoat® D 8337 unsaturated polyester resin and Uvecoat® 3101 unsaturated polyester resin.

II. DSM Coating Resins, Zwolle, The Netherlands under the trademark Uracross® ZW 4892 P Unsaturated polyester, Uracross® ZW 4557 P Unsaturated polyester resin, Uracross® ZW 4989 P Unsaturated polyester resin with methacrylate end groups, Uracross® ZW 5125 P unsaturated polyester resin, Uracross 5026 P unsaturated polyester resin with GMA functional groups, Uracross® ZW 4901 P unsaturated polyester resin with maleate end groups, and Uracross® P 3125 unsaturated polyester resin with maleate end groups.

III. Solutia Inc, St. Louis, Mo. under the trademark Viaktin® VAN 1743 Unsaturated polyester resin, Viaktin® 03490 Unsaturated polyester resin with methacrylate end groups, Viaktin® 03890 Unsaturated polyester resin with methacrylate end groups, Viaktin® 03929 Unsaturated polyester resin with methacrylate end groups, Viaktin® 03732 Unsaturated polyester resin with methacrylate end groups, and Viaktin® 03729 Semi-crystalline unsaturated polyester resin with methacrylate end groups.

IV. Cray Valley, Saint Celani, Spain under the trademark Reafree® ND-1291 Unsaturated polyester resin, Reafree® ND-1530 Saturated polyester resin with acrylate groups and Reafree® ND-1446 Saturated polyester resin.

V. Panolam, Auburn, Me. under the trademark Pioester® 1937 Unsaturated polyester resin, Pioester® 275 Unsaturated polyester resin and Pioester® 202 HV Unsaturated polyester resin.

Suitable blends of crosslinkable polyesters and other crosslinkable polymers include Uvecoat® 3000 mixture of unsaturated polyester and epoxy acrylate resin, Uvecoat® 3001 mixture of unsaturated polyester and epoxy acrylate resin, Uvecoat® 3002 mixture of unsaturated polyester and epoxy acrylate resin and Uvecoat® 3003 mixture of unsaturated polyester and epoxy acrylate resin, all supplied by UCB Chemicals of Smyrna, Ga.

Some of the crosslinkable groups that are suitable for the crosslinkable polyurethane include acrylate, methacrylate, maleate, fumarate, itaconate, alkenoxy and a combination thereof.

If desired, the crosslinkable polyurethane can be blended with other suitable crosslinkable polymers.

The crosslinkable polyurethanes are generally made by condensing polyisocyanates with polyols, which are described above, and with monomers bearing the crosslinkable groups described above. Suitable polyisocyanates include aliphatic or cycloaliphatic di-, tri- or tetra-isocyanates, which may or may not be ethylenically unsaturated. Some specific examples of aliphatic polyisocyanates include 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, isophorone diisocyanate, 4-methyl-3-diisocyanatocyclohexane, trans-viny lidene diisocyanate, dicyclohexylmethane-4,4'-diisocyanate, 3,3'-dimethyl-dicyclohexylmethane 4,4'-diisocyanate and meta-tetramethylxylylene diisocyanate; polyisocyanates having isocyanurate structural units, such as the isocyanurate of hexamethylene diisocyanate and isocyanurate of isophorone diisocyanate; the adduct of 2 molecules of a diisocyanate, such as hexamethylene diisocyanate; uretidiones of hexamethylene diisocyanate; uretidiones of isophorone diisocyanate or isophorone diisocyanate; the adduct of 3 molecules of hexamethylene diisocyanate and 1 molecule of water (available under the trademark Desmodur® N of Bayer Corporation, Pittsburgh, Pa.). Examples of suitable aromatic polyisocyanates include toluene diisocyanate and diphenylmethane diisocyanate.

Suitable monomers bearing the aforedescribed crosslinkable groups include vinyl ethers, such as 2-hydroxyethyl vinyl ether and 4-hydroxybutyl vinyl ether, and esters such as 2-hydroxyethyl acrylate, 2-hydroxyethyl methacrylate, 4-hydroxybutyl acrylate and 4-hydroxybutyl methacrylate.

Some of the suitable commercial crosslinkable polyurethanes include those supplied by:

I. Cray Valley, Saint Celani, Spain under the trademark Reafree® ND-1605 Acrylated aromatic polyurethane resin and Reafree® ND-1605/2 Acrylated aliphatic polyurethane resin.

II. DSM Coating Resins, Zwolle, The Netherlands under the trademark Uracross® P 3898 Vinylether urethane polyester, Uracross® ZW 5150 P epoxy acrylate resin with maleate end groups and Uracross® ZW 5151 P epoxy acrylate resin with maleate end groups.

III. Solutia Inc, St. Louis, Mo. under the trademark Viaktin® 03546 unsaturated urethane acrylic resin.

IV. Bayer Corp, Pittsburgh, Pa. under the trademark FAC® 314 Urethane acrylate resin and FAC® 320 B Urethane acrylate resin.

V. Bomar Specialty Company, Winstead, Conn. under the trademark XJH1-148 A urethane acrylate and STC3-130 A urethane acrylate resin.

VI. DuPont Company, Wuppartal, Germany under the trademark Dekatol® SK 1866 Urethane acrylate resin and Dekatol® SK 2092 Urethane acrylate resin.

VII. Estron, Calvert City, Ky. under the trademark U-810 Epoxy acrylate resin.

IX. Dow Chemical, Freeport, Tex., under the trademark XZ92478.00 Epoxy acrylate.

The crosslinkable acrylated polyethers are generally made by the reaction of epoxy-functional polyethers with ethylenically unsaturated carboxylic acids. Some of the suitable epoxy functional polyethers include polymers of bisphenol A and epichlorohydrin; and polymers of bisphenol F and epichlorohydrin. Some of the suitable ethylenically unsaturated carboxylic acids include acrylic acid, methacrylic acid, maleic acid, itaconic acid and fumaric acid.

The crosslinkable acrylic polymer suitable for use in the present invention can have a glass transition temperature ranging from about 40° C. to about 100° C., preferably from about 45° C. to about 65° C.; a GPC weight average molecular weight, using polystyrene as the standard, ranging from about 1000 to about 30,000, preferably from about 2000 to about 20,000. The crosslinkable acrylic polymer can have a concentration of crosslinkable groups ranging from about 0.3 percent to about 10 percent, preferably 0.5 percent to about 3 percent of the weight of the crosslinkable acrylic polymer. Some of the suitable crosslinkable groups include acrylate, methacrylate, maleate, fumarate, itaconate and a combination thereof.

The crosslinkable acrylic polymer can be prepared by the reaction at elevated temperatures ranging from 50° C. to 220° C. of epoxy-functional acrylic polymer with (meth) acrylic acid, fumaric acid, itaconic acid and maleic acid; hydroxy-functional acrylic polymers with (meth)acrylic acid, fumaric acid, itaconic acid and maleic acid and anhydrides thereof; or anhydride-functional polymer with hydroxy-functional ethylenically unsaturated monomers.

Suitable epoxy functional acrylic polymers can be conventional polymers having a GPC weight average molecular weight ranging from 1,000 to 30,000. Commercial epoxy-functional acrylic polymers, among others, are supplied by Anderson Acrylic Company, Adrian, Mich. under the trademark of Almatex® PD 7610 and Almatex® PD 7690.

Suitable hydroxy functional acrylic polymers are conventional polymers having a GPC weight average molecular weight ranging from 1,000 to 30,000. Commercial hydroxy-functional acrylic polymers, among others, are supplied by S. C. Johnson Company, Racine, Wis., under the trademark of Joncryl® 802 and Joncryl® 804.

The free radical initiators suitable for use in the present invention include one or more free radical photoinitiators, one or more free radical thermal initiators or a combination thereof. The free radical photoinitiators are initiated photolytically, and the free radical thermal initiators are initiated upon exposure to elevated temperatures. A combination of UV photoinitiation and thermal initiation (dual cure) can be also employed. When used as a combination, the proportion by weight of the thermal initiator to photoinitiator ranges from 10:90::90:10, preferably 25:75::75:25.

Some of the suitable free radical photoinitiators include bis-acyl phosphine oxides, such as 2,4,6-trimethylbenzoyl diphenylphosphine oxide; α-hydroxy ketones. Some of the other suitable free radical photoinitiators initiators include:

I. α-cleavage free radical photoinitiators, include benzoin and its derivatives, for example, benzoin ethers, such as isobutyl benzoin ether and benzyl ketals, such as benzyl dimethyl ketal, 2-hydroxy-2-methyl-1-phenylpropan-1-one and 4-(2-hydroxyethoxy) phenyl-2-hydroxy-2-propyl ketone.

II. Aryl ketones, such as 1-hydroxycyclohexyl phenyl ketone, 2-benzyl-2-dimethylamino-1-(4-morpholinophenyl)-butan-1-one, 2,2-dimethoxy-2-phenylaceto-phenone, mixture of benzophenone and 1-hydroxycyclohexyl phenyl ketone, perfluorinated diphenyl titanocene, and 2-methyl-1-(4-(methylthiophenyl)-2-(4-morpholinyl))-1-propanone.

Hydrogen abstraction free radical type photoinitiators can be used in combination with the above or alone such as Michler's ketone (4,4'-bisdimethylamino benzophenone), Michler's ethyl ketone (4,4'-bisdiethylamino benzophenone ethyl ketone), benzophenone, thioxanthone, anthroquinone, d,l-camphorquinone, ethyl d,l-camphorquinone, ketocoumarin, anthracene, or derivatives thereof.

Some of the suitable commercial suitable photoinitiators are supplied by Ciba Specialty Chemicals, Basel, Switzerland under the trademark Irgacure® 819 Bis acyl phosphine oxide photoinitiator and Irgacure® 2959 a-hydroxy ketone photoinitiator.

Some of the suitable free radical thermal initiators include organic peroxides, such as benzoyl peroxide; diacyl peroxides, such as 2-4-diclorobenzyl peroxide, diisononanoyl peroxide, decanoyl peroxide, lauroyl peroxide, succinic acid peroxide, acetyl peroxide, benzoyl peroxide, and diisobutyryl peroxide; acetyl alkylsulfonyl peroxides, such as acetyl cyclohexylsulfonyl peroxide; dialkyl peroxydicarbonates, such as di(n-propyl)peroxy dicarbonate, di(sec-butyl)peroxy dicarbonate, di(2-ethylhexyl)peroxy dicarbonate, diisopropylperoxy dicarbonate, and dicyclohexylperoxy dicarbonate; peroxy esters, such as α-cumylperoxy neodecanoate, α-cumylperoxy pivalate, t-amyl neodecanoate, t-amylperoxy neodecanoate, t-butylperoxy neodecanoate, t-amylperoxy pivalate, t-butylperoxy pivalate, 2,5-dimethyl-2,5-di(2-ethylhexanoylperoxy)hexane, t-amylperoxy-2-ethyl hexanoate, t-butylperoxy-2-ethyl hexanoate, and t-butylperoxy isobutyrate; azobis (alkyl nitrile) peroxy compounds, such as 2,2'-azobis-(2,4-dimethylvaleronitrile), azobisisobutyronitrile, and 2,2'-azobis-(2-methylbutyronitrile); t-butyl-peroxymaleic acid, 1,1'-azobis-(1-cyclohexanecarbonitrile); peroxy ketals, such as 1,1-di(t-butylperoxy)-3,3,5-trimethylcyclohexane; peroxy esters, such as o,o'-t-butyl-o-isopropyl monoperoxy carbonate, 2,5-dimethyl-2,5-di(benzoylperoxy) carbonate, o,o'-t-butyl-o-(2-ethylhexyl)-monoperoxy carbonate, t-butylperoxy acetate, t-butylperoxy benzoate, di-t-butyidiperoxy azelate, and di-t-butyldiperoxy phthalate; dialkylperoxides, such as dicumyl peroxide, 2,5-dimethyl-2,5-di(t-butylperoxy) hexane, t-butyl cumyl peroxide, di-t-butyl peroxide, and 2,5-dimethyl,2,5-di(t-butylperoxy)hexyne-3; hydroperoxides, such as 2,5-dihydroperoxy-2,5-dimethyl hexane, cumene hydroperoxide, t-butyl hydroperoxide and t-amyl hydroperoxide, ketone peroxides; such as n-butyl-4,4-bis-(t-butylperoxy)valerate, 1,1-di(t-butylperoxy)-3,3,5-trimethyl cyclohexane, 1,1'-di-t-amyl-peroxy cyclohexane, 2,2-di(t-butylperoxy) butane, ethyl-3,3-di(t-butylperoxy) butyrate, and blend of t-butyl peroctoate, and 1,1-di(t-butylperoxy)cyclohexane; and diazo compounds, such as 1,1'-azobis(cyclohexanecarbonitrile)peroxide.

Additional thermal and photoinitiators are disclosed in U.S. Pat. No. 5,922,473; U.S. Pat. No. 6,005,017; and U.S. Pat. No. 6,017,640, all of which are incorporated herein by reference.

In addition to the foregoing, the powder coating compositions of this invention can contain other additives that are conventionally used in powder coating compositions. Examples of such additives include fillers, extenders, flow additives, catalysts, light stabilizers, hardeners and pigments. Compounds having anti-microbial activity can also be added. Such compounds are disclosed in U.S. Pat. No. 6,093,407, which is incorporated herein by reference.

The gloss of a coating from the powder coating composition of the present invention can be further reduced by including about 5 percent to about 60 percent, preferably about 10 percent to about 50 percent and more preferably about 20 percent to about 40 percent of spheroidal particles, all percentages being in weight percent based on the total weight of the coating composition and wherein said spheroidal particles have a median particle diameter ranging from about 10 micrometers to about 50 micrometers, preferably from 15 micrometers to 50 micrometers. As the mean particle diameter decreases, the surface per unit weight increases. The increase in surface area results in a tendency of the filler to dry the coating, reduce flow, and induce roughness in the coating. Spheroidal particles having a mean diameter of less than 10 micrometers had less effect in further reducing gloss, whereas at mean diameters greater than 10 micrometers, particularly of greater than 15 micrometers, the presence of spheroidal particles resulted in further gloss reduction.

The upper limit of the diameter of the spheroidal particles is dependent on the intended thickness of the final coating in that the particles must have a diameter less than the coating thickness. Most powder coatings, especially "decorative" powder coatings, are designed to be applied at a dry film thickness of about 50 microns. Thus, in most applications, the spheroidal particles should have a maximum diameter of less than about 50 microns, preferably 40 microns.

The spheroidal particles suitable for use in the present invention include glass microspheres, ceramic microspheres, spheroidal minerals, polymer microspheres, metal microspheres or a combination thereof.

Some of suitable commercially available spheroidal particles are listed below:

TABLE 1

Spheroidal Gloss Control Agents

| Grade | Max. Dia. ($\mu$m) | Median Dia. ($\mu$M) | Gloss Reduction |
|---|---|---|---|
| Glass Microspheres (Potters Industries, Inc, Valley Forge, Pennsylvania) | | | |
| Spheriglass ™ 3000E | 90% ≦ 60 $\mu$m | 35 | High[1] |
| Spheriglass ™ 3000E screened at 45 $\mu$m | 45 | 23 | High |
| Spheriglass ™ 10000E | 6 | 3 | Low (too fine) |
| Ceramic Microspheres (3M Corporation, Minneapolis, Minnesota) | | | |
| G200 Zeeospheres ™ | 12 | 4 | Low (too fine) |
| G400 Zeeospheres ™ | 24 | 5 | Low (too fine) |
| G600 Zeeospheres ™ | 40 | 6 | Low (too fine) |
| W610 Zeeospheres ™ | 40 | 10 | Marginal (too fine) |
| G800 Zeeospheres ™ | 200 | 18 | High[1] |
| G850 Zeeospheres ™ | 200 | 40 | High[1] |
| G850 Zeeospheres ™ screened at 45 $\mu$m | 45 | 20 | High |
| Cristobalite (C.E.D. Process Minerals, Inc., Akron, Ohio) | | | |
| Goresil ™ C-400 | 100 | 9 | Low (too fine)[1] |
| Goresil ™ 1045 | 45 | 10 | Marginal (too fine) |
| Goresil ™ 835 | 35 | 8 | Low (too fine) |
| Goresil ™ 525 | 25 | 5 | Low (too fine) |
| Goresil ™ 215 | 15 | 2 | Low (too fine) |

The low gloss powder coating composition can be prepared by utilizing the following steps of:

A base polymer selected from the group consisting of a crosslinkable polyester, crosslinkable polyurethane, crosslinkable acrylated polyether and a combination thereof; about 5 percent to about 60 percent of a crosslinkable acrylic polymer and about 0.1 to 10 percent of one or more free radical initiators are mixed in a conventional mixer to form a blend. All the aforedescribed percentages are in weight percent based on total weight of the crosslinkable base and acrylic polymer solids. Then, the blend is heated, typically in a conventional extruder, into a molten blend. The melt temperature, depending upon the chemical make-up of the composition, generally ranges from 80° C. to 150° C. The molten blend is then melt extruded into a molten extrudate. Typically, the melt extruding step takes place under sufficient pressure to produce a molten extrudate, which is then solidified into a solid extrudate, typically by passing it through chilled rolls. The solidified extrudate is then fractured by conventional means, such as by passing though toothed or grooved rollers, into fragments, which are then conventionally ground into ground fragments of size ranging from 5 to 200, preferably 10 to 100 micrometers. If desired, uniformity of the particle size can be improved by straining the ground fragments through screen, such as a 180-micrometer screen, to remove coarse fragments. If desired, water or an aqueous medium can be added to ground fragments to form aqueous slurry.

If desired, the blend described above can include the aforedescribed spheroidal particles in the aforestated percentages.

A smooth coating having low gloss can be produced in accordance with the following steps:

A layer of the aforedescribed low gloss powder coating composition is applied over a substrate by conventional means, such as by electrostatic spray, thermal or flame spray, or by submersing in a fluidized bed containing the powder coating composition. If desired, the powder coating composition can contain the aforedescribed spheroidal particles in the aforedescribed quantities. The coatings can be applied over metallic or non-metallic substrates. The layer thickness is adjusted to produce a coating thickness ranging from 10 micrometers to 500 micrometers. It should be understood that the coating thickness is dependent upon its intended use. Thus, for example when applied over a reconstituted wood substrate, it can range from 25 to 300 micrometers (1 to 12 mils), when applied over metal substrate, it can range from 10 to 500 micrometers (0.5 to 20 mils).

Following deposition of the layer of the powder coating composition on the substrate, the substrate is typically heated to melt the composition and cause it to flow and form a film over the substrate surface. In certain applications, the substrate or a portion thereof to be coated may be pre-heated before the application of the powder, and then, if desired, heated again after the application of the powder. Gas or electrical furnaces are commonly used for these various heating steps, but other methods (e.g., microwave) are also known. Typically, depending upon the chemical make up of the coating composition, the layer is heated to a temperature raging from about 80° C. to about 200° C., preferably about 80° C. to about 150° C., and more preferably about 80° C. to about 120° C. Typically, depending upon the chemical make up of the coating composition, the layer is exposed to the aforedescribed temperatures for about 0.5 to 10 minutes, preferably about 1 to about 5 minutes. The higher the temperature, the shorter will be the time of exposure and vice versa.

Once the film is formed on the substrate, it is cured into a low gloss coating, which can be smooth. The film can be cured through several alternative means. For example, the film can be cured by exposing it to actinic radiation, by exposing it to elevated temperatures, by sequentially exposing it to elevated temperatures followed by exposure to actinic radiation, by sequentially exposing it to actinic radiation followed by exposure to elevated temperatures, preferably for about 5 to about 30 minutes; or by simultaneously exposing it to actinic radiation and elevated temperatures.

Depending upon the chemical make-up of the coating composition, typical elevated temperatures range from 90° C. to 220° C., preferably from 100° C. to 200° C. and more preferably from 100° C. to 170° C. Thermal curing can be effected by conventional ovens, which employ heat conduction, convection, radiation or any combination thereof.

Depending upon the chemical make-up of the coating composition, typical actinic radiation includes UV radiation, electron beam radiation, or a combination thereof at a dose of about 0.25 to about 5.0, preferably of about 0.5 to about 3 joules per square centimeters.

EXAMPLES

The following components are listed in the Examples described below:

Polymer 1 (Preparation of Crosslinkable Acrylic Polymer)

In a three-necked glass reactor equipped with a stirrer, thermocouple and funnel, 700 weight parts (wt-parts) of butylacetate were heated to 120° C. Then, a mixture of 1302 wt-parts glycidyl methacrylate, 348 wt-parts styrene and 747 wt-parts of methyl methacrylate were added over 6.5-hour period. Simultaneously, a solution of 215 wt-parts of tertiary butyl peroctoate in 250 wt-parts of butylacetate was also added. At the end of 6.5 hours, additional solution of 34 wt-parts of tertiary butyl peroctoate in 34 wt-parts of butylacetate was added to the batch. Then, 50 wt-parts of butylacetate were used for the rinsing of the monomer and initiator pipes. The batch is kept at 120° C. for additional 4-hour period. Thereafter, 6.4 wt-parts of 4-Methoxyphenole were added to the batch followed by the addition of 103 wt-parts of acrylic acid and 210 wt-parts of butylacetate. The batch was kept at 120° C. till the acid number was below 1 mgKOH/g resin solids. Afterwards vacuum was applied and the solvent was removed until a solids content of >99% was reached. The viscous resulting acryloyl functional acrylic polymer was poured onto a flat container and was broken and crushed after solidification. The polymer had a Tg of 57–62° C. (measured via DSC), a melt viscosity at 150° C. of 1800 cP and a content of double bonds of 1.4% (calculated as C═C equals 24D).

Uvecoat® 3002 unsaturated polyester resin from UCB Chemicals, Smyrna, Ga.

Uvecoat® 3001 mixture of unsaturated polyester resin and epoxy acrylate resin from UCB Chemicals, Smyrna, Ga.

Uvecoat® 3101 unsaturated polyester resin from UCB Chemicals, Smyrna, Ga.

Uralac® 3125 unsaturated polyester resin from DSM Coating Resins, Zwolle, The Netherlands.

Uracross® 3307 divinyl ether crosslinking agent from DSM Coating Resins, Zwolle, The Netherlands.

Uvecoat® 2100 unsaturated polyester resin from UCB Chemicals, Smyrna, Ga.

Uvecoat® 9010 crystalline unsaturated polyester resin with methacrylate end groups from UCB Chemicals, Smyrna, Ga.

Irgacure® 819 photoinitiator from Ciba Specialty Chemicals, Basel, Switzerland.

Irgacure® 2959 photoinitiator from Ciba Specialty Chemicals, Basel, Switzerland.

R-706® titanium dioxide pigment from E. I. DuPont de Nemours, Wilmington, Del.

Spheriglass® 3000E glass bead filler from P. Q. Corporation, Valley Forge, Pa. (sieved at 325 mesh to remove particles larger than 45 micrometers)

Modaflow® III flow aid from Solutia, St. Louis, Mo.

Luperox® ACP35 benzoyl peroxide thermal free radical curing agent from Atofina Specialty Chemicals, Philadelphia, Pa.

Powder coating compositions listed in Tables 2, 3 and 4 are prepared by the standard method. Components are combined and bag-blended, then melt-extruded. The extrudate is solidified between chilled rolls, then broken up and ground to powder. Powders are strained through an 80 mesh (180 microns) screen to remove coarse particles.

Coatings are prepared by applying the powdered compositions listed in Tables 2 and 4 to mild steel panels of 0.032" thickness, melting the coating for 4 minutes at 121° C.–177° C. (250–350° F.), followed by exposure for 15 seconds to ultraviolet radiation from two lamps, a Fusion "V" lamp and a Fusion "H" lamp, for a total dose of approximately 2.5 J/cm$^2$.

The coatings in Table 3 are prepared by preheating a 1" thick sample of medium density fiberboard to a surface temperature of 65° C. (150° F.), applying powder by electrostatic spray, melting the coating for 4 minutes at 93° C.–127° C. (200-260° F.), followed by exposure for 15 seconds to ultraviolet radiation from two lamps, a Fusion "V" lamp and a Fusion "H" lamp for a total dose of approximately 2.5 J/cm$^2$.

After cooling, the coated substrates are evaluated for gloss, smoothness and chemical resistance. The ASTM test for 60° Gloss is ASTM D523-89. The following process is used to determine chemical resistance:

MEK Chemical Resistance Test (1) With a cotton swab saturated with methyl ethyl ketone (MEK), a one-inch length of a coated part is rubbed with fifty double-rubs. A double rub consisted of once up the coated surface and once back, as if erasing a pencil mark. Use Approximately the same force is used as that when erasing with a pencil eraser.

(2) After the double rubs, the MEK is allowed to evaporate and the coating is rated as follows:

I. Rub through, i.e., the substrate is exposed.

II. Heavy rub-off, i.e., a large percentage, greater than 25% of the coating thickness as visually determined, is removed, but the substrate is not exposed. With a non-white pigmented coating, a large quantity of pigment is observable on the cotton swab.

III. Moderate rub-off, i.e., a moderate percentage, 10-25% of the coating thickness, is removed. With a non-white, pigmented coating, a moderate quantity of pigment is observable on the cotton swab.

VI. Light rub-off, i.e., a small amount, less than 10% of the coating, is removed. A small amount of pigment is observable on the swab. Loss of gloss as noted.

V. No effect, i.e., a rub off is observed. No loss of gloss is observed.

(3) Although the standard rating is 1, 2, 3, 4 or 5, intermediate values (for example 1.5, 2.5 etc.) can be also used when ranking coatings

TABLE 2

| Component[1] | Ctl1 | Ctl2 | Ctl3 | Ctl4 | 5 | 6 | 7 | 8 | 9 | 10 | 11 | 12 | 13 | 14 |
|---|---|---|---|---|---|---|---|---|---|---|---|---|---|---|
| Coating Formulations (Parts by Weight) | | | | | | | | | | | | | | |
| Polymer 1 | 100 | — | — | — | 50 | 30 | 20 | 10 | 50 | 50 | 30 | 50 | 30 | 50 |
| Uvecoat ® 2100 | — | 100 | — | — | 50 | 70 | 80 | 90 | 50 | — | — | — | — | — |
| Uvecoat ® 3002 | — | — | 100 | — | — | — | — | — | — | 50 | 70 | — | — | — |
| Uralac ® 3125 | — | — | — | 85 | — | — | — | — | — | — | — | 35 | 55 | 35 |
| Uracross ® 3307 | — | — | — | 15 | — | — | — | — | — | — | — | 15 | 15 | 15 |
| Spheriglass ® 3000E | — | — | — | — | — | — | — | — | 40 | — | — | — | — | 40 |
| Coating Properties | | | | | | | | | | | | | | |
| Gloss (60° Reflectance) | 86 | 97 | 97 | 96 | 73 | 31 | 46 | 51 | 47 | 64 | 57 | 61 | 41 | 27 |
| Smoothness[3] | 6 | 4 | 7 | 4 | 1 | 6 | 3 | 2 | 5 | 6 | 8 | 5 | 3 | 7 |
| Chemical Resistance[4] | 3.5 | 4 | 3 | 5 | 3.5 | 2.5 | 2.5 | 4 | 4.5 | 4 | 2.5 | 3 | 4 | 3 |

Notes
[1]Ctl1, Ctl2, Ctl3 and Ctl4 are comparative examples.
[2]All coatings also contained Modaflow ® III, 1.3 parts; Irgacure ® 819, 2.5 parts; Irgacure ® 2959, 0.5 parts; and R-706 ®, 40 parts.
[3]PCI Smoothness: By comparison to standards from 1 (heavy orange peel) to 10 (smooth).
[4]Determined by subjecting the coating to 50 double rubs with a methyl ethyl ketone-soaked cotton swab, rating from 1 (rub through) to 5 (no effect).
[5]All the foregoing coatings had writable smoothness.

TABLE 3

| Component[1] | Ctl5 | 15 | 16 |
|---|---|---|---|
| Coating Formulations (Parts by Weight) | | | |
| 046X021-42 | — | 30 | 30 |
| Uvecoat 3001 | 34.3 | 24 | 24 |
| Uvecoat 3101 | 51.4 | 36 | 36 |
| Uvecoat 9010 | 14.3 | 10 | 10 |
| Spheriglass 3000E (sieved at 45 microns) | | | 40 |
| Coating Properties | | | |
| Gloss (60° Reflectance) | 58 | 36 | 26 |
| Smoothness[2] | 8 | 9 | 9 |
| Chemical Resistance[3] | 4 | 4 | 4 |

Notes
[1]Ctl5 is a comparative example.
[2]All coatings also contained Modaflow ® 6000, 1.3 parts; Irgacure 819, 1.5 parts; Irgacure 2959, 1.0 parts; and R-706, 30 parts.
[3]PCI Smoothness: By comparison to standards from 1 (heavy orange peel) to 10 (smooth).
[4]Determined by subjecting the coating to 50 double rubs with a methyl ethyl ketone-soaked cotton swab, rating from 1 (rub through) to 5 (no effect).
[5]All the foregoing coatings had writable smoothness.

TABLE 4

| Component[1] | Ctl6 | Ctl7 | Ctl8 | Ctl9 | Ctl10 | Ctl11 | Ex. 17 | Ex. 18 | Ex. 19 |
|---|---|---|---|---|---|---|---|---|---|
| Coating Formulations (Parts by Weight) | | | | | | | | | |
| Polymer 1 | 100 | — | 100 | — | 100 | — | 30 | 30 | 30 |
| Uvecoat ® 3002 | — | 100 | — | 100 | — | 100 | 70 | 70 | 70 |
| Irgacure ® 819 | 2.5 | 2.5 | — | — | 2.5 | 2.5 | 2.5 | — | 2.5 |
| Irgacure ® 2959 | 0.5 | 0.5 | — | — | 0.5 | 0.5 | 0.5 | — | 0.5 |
| Luperox ® ACP35 | — | — | 1.0 | 1.0 | 0.5 | 0.5 | — | 1.0 | 0.5 |
| Coating Properties | | | | | | | | | |
| Gloss (60° Reflectance) | 87 | 97 | 82 | 85 | 82 | 86 | 9 | 8 | 8 |
| Smoothness[2] | 7 | 7 | 1 | 1 | 2 | 1 | 5 | 6 | 4 |
| Chemical Resistance[3] | 1.5 | 3 | 1.5 | 1 | 1.5 | 4.5 | 3 | 2 | 4.5 |

Notes
[1]All coatings also contained Modaflow ® III, 1.3 parts; and R-706 ®, 40 parts.
[2]PCI Smoothness: By comparison to standards from 1 (heavy orange peel) to 10 (smooth).
[3]Determined by subjecting the coating to 50 double rubs with a methyl ethyl ketone-soaked cotton swab, rating from 1 (rub through) to 5 (no effect).
[4]All the foregoing coatings had writable smoothness.

Discussion of Results

Controls (Comparative Examples) 1–4

These comparative examples, which are outside the scope of the invention show the high gloss typical of commercial UV resin systems. Coatings show light to moderate orange peel, and good to excellent chemical resistance.

Controls (Comparative Example) 5

This example, outside the scope of the invention, shows the lowest gloss smooth coating currently available where low gloss comes from combinations of resins, and where crosslinkable acrylic polymer is not included.

Examples 5–8

These examples show the effect of varied amounts of the crosslinkable acrylic polymer blended with the crosslinkable polyester (Uvecoat® 2100). Lowest gloss and optimum smoothness are seen when the blend includes 30 Wt. % of Polymer 1. Gloss is desirably reduced from 86 and 97 (Ctl.1 and Ctl.2) to 31 (Ex. 6), while smoothness is desirably maintained or increased from 6 and 4 (Ctl. 1 and Ctl. 2) to 6 (Ex.6). Minimal reduction in chemical resistance is observed (from 3.5 and 4 (Ctl. 1 and Ctl. 2)) to 2.5 (Ex.6).

Examples 10 and 11

These examples show that that the trend observed in Examples 5–8 is also observed for other acrylic/polyester combinations. Gloss is desirably reduced from 86 and 97 (Ctl. 1 and Ctl. 3) to 64 and 57 (Ex. 10 and Ex. 11), and while smoothness is desirably increased from 6 and 7 (Ctl. 1 and Ctl. 3) to 6 and 8 (Ex. 10 and Ex. 11). Minimal reduction in chemical resistance is observed, from 3.5 and 3 (Ctl. 1 and Ctl. 3) to 2.5 (Ex.11).

Examples 12 and 13

These examples show that the trend observed in Examples 5–8 and 10–11 is also observed for combinations of crosslinkable acrylic polymer with blends of crosslinkable polyester and crosslinkable polyurethane. Gloss is desirably reduced from 86 and 96 (Ctl. 1 and Ctl. 4) to 41 (Ex. 13). Minimal reduction in smoothness is observed, from 6 and 4 (6 μl. 1 and Ctl. 4) to 3 (Ex.13). Minimal reduction in chemical resistance is observed, from 3.5 and 5 (Ctl. 1 and Ctl. 4) to 4 (Ex.13).

Example Pair 5 and 9, Example Pair 12 and 14, and Example Pair 15 and 16

These example pairs show that a significant reduction in gloss and increase in smoothness is observed upon the addition of spheroidal glass fillers. Addition of 40 parts spheroidal filler reduced gloss from 73 (Ex. 5) to 47 (Ex. 9) while improving the smoothness from 1 to 5. Addition of 40 parts spheroidal filler reduced gloss from 61 (Ex. 12) to 27 (Ex. 14) while improving smoothness from 5 to 7. Addition of 40 parts spheroidal filler reduced gloss from 36 (Ex. 15) to 26 (Ex. 16) without affecting smoothness.

Examples 15 and 16

These examples show that low gloss coatings can be obtained at powder melt-out temperatures of 90–120° C. typically used for heat-sensitive substrates such as medium density fiberboard. The presence of crosslinkable acrylic polymer when compared to Control 5 not only reduced gloss, but also improved smoothness.

What is claimed is:

1. A powder coating composition that produces a low gloss coating upon cure, said composition comprising:
    a base polymer selected from the group consisting of a crosslinkable polyester, crosslinkable polyurethane, crosslinkable acrylated polyether and a combination thereof;
    about 5 percent to about 60 percent of crosslinkable acrylic polymer having a glass transition temperature ranging from about 40° C. to about 100° C; and
    about 0.1 to 10 percent of one or more free radical initiators, all percentages in weight percent based on total weight of said crosslinkable base and acrylic polymer solids.

2. The powder coating composition of claim 1 further comprising about 5 percent to 50 percent of spheroidal particles, all percentages being in weight percent based on the total weight of the coating composition and wherein said spheroidal particles have a median particle diameter ranging from about 10 microns to about 50 microns.

3. The coating composition of claim 2 wherein the spheroidal particles are selected from the group consisting of glass microspheres, ceramic microspheres, spheroidal minerals, polymer microspheres, metal microspheres and a combination thereof.

4. The coating composition of claim 1 wherein said crosslinkable acrylic polymer has a GPC weight average molecular weight ranging from about 1000 to about 30,000.

5. The coating composition of claim 1, 2, 3, or 4 wherein said crosslinkable acrylic polymer has a concentration of crosslinkable groups ranging from about 0.3 percent to about 10 percent of the weight of the crosslinkable acrylic polymer.

6. The coating composition of claim 5 wherein said crosslinkable groups are acrylate, methacrylate, maleate, fumarate, itaconate and a combination thereof.

7. The coating composition of claim 1 wherein said free radical initiator comprises a thermal initiator, photoinitiator or a combination thereof.

* * * * *